United States Patent
Yehezkel et al.

(10) Patent No.: US 9,247,225 B2
(45) Date of Patent: Jan. 26, 2016

(54) VIDEO INDEXING WITH VIEWER REACTION ESTIMATION AND VISUAL CUE DETECTION

(71) Applicant: Intel Corporation, Santa Clara, CA (US)

(72) Inventors: Raanan Yehezkel, Kiryat Ekron (IL); David Stanhill, Hoshaya (IL)

(73) Assignee: Intel Corporation, Santa Clara, CA (US)

(*) Notice: Subject to any disclaimer, the term of this patent is extended or adjusted under 35 U.S.C. 154(b) by 605 days.

(21) Appl. No.: 13/626,161

(22) Filed: Sep. 25, 2012

(65) Prior Publication Data
US 2014/0086554 A1    Mar. 27, 2014

(51) Int. Cl.
| | |
|---|---|
| *H04N 9/80* | (2006.01) |
| *H04N 9/82* | (2006.01) |
| *G11B 27/10* | (2006.01) |
| *H04N 21/25* | (2011.01) |
| *H04N 21/258* | (2011.01) |
| *H04N 21/266* | (2011.01) |
| *H04N 21/278* | (2011.01) |
| *H04N 21/442* | (2011.01) |
| *H04N 21/845* | (2011.01) |

(Continued)

(52) U.S. Cl.
CPC ........ *H04N 9/8205* (2013.01); *G06F 17/30817* (2013.01); *G11B 27/105* (2013.01); *H04N 21/251* (2013.01); *H04N 21/25891* (2013.01); *H04N 21/26603* (2013.01); *H04N 21/278* (2013.01); *H04N 21/44218* (2013.01); *H04N 21/8456* (2013.01); *H04N 21/8549* (2013.01)

(58) Field of Classification Search
CPC ............. H04N 9/8205; H04N 21/251; H04N 21/25891; H04N 21/26603; H04N 21/278; H04N 21/44218; H04N 21/8456; H04N 21/8549; G11B 27/105; G06F 17/30817
See application file for complete search history.

(56) References Cited

U.S. PATENT DOCUMENTS

| | | | |
|---|---|---|---|
| 2003/0118974 A1* | 6/2003 | Obrador ........................ | 434/236 |
| 2007/0203426 A1* | 8/2007 | Kover et al. .................. | 600/558 |

(Continued)

FOREIGN PATENT DOCUMENTS

| | | |
|---|---|---|
| WO | 2009/003885 A2 | 1/2009 |
| WO | 2012/027607 A2 | 3/2012 |

OTHER PUBLICATIONS

International Search Report and Written Opinion received for PCT Patent Application No. PCT/US2013/058938, mailed on Dec. 27, 2013, 10 pages.
Bengio et al., "Out-of-Sample Extensions for LLE, Isomap, MDS, Eigenmaps, and Spectral Clustering", Technical Report 1238, University of Montreal, Jul. 25, 2003, 10 pages.

(Continued)

*Primary Examiner* — Tat Chio
(74) *Attorney, Agent, or Firm* — Grossman, Tucker, Perreault & Pfleger, PLLC

(57) ABSTRACT

Generally, this disclosure provides methods and systems for video indexing systems with viewer reaction estimation based on visual cue detection. The method may include detecting visual cues generated by a user, the visual cues generated in response to the user viewing the video; mapping the visual cues to an emotion space associated with the user; estimating emotion events of the user based on the mapping; and indexing the video with metadata, the metadata comprising the estimated emotion events and timing data associated with the estimated emotion events. The method may further include summarization, partitioning and searching of videos based on the video index.

26 Claims, 6 Drawing Sheets

(51) Int. Cl.
  *H04N 21/8549*  (2011.01)
  *G06F 17/30*  (2006.01)

(56) References Cited

U.S. PATENT DOCUMENTS

2008/0193016 A1    8/2008   Lim et al.
2012/0124456 A1    5/2012   Perez et al.
2012/0324491 A1*  12/2012   Bathiche et al. ............... 725/10

OTHER PUBLICATIONS

Bennett et al., "The Netflix Prize", KKK Cup and Workshop 2007, San Jose, California, Aug. 12, 2007, 4 pages.
Mazumder et al., "Spectral Regularization Algorithms for Learning Large Incomplete Matrices", Journal of Machine Learning Research 11 (2010), 36 pages.
International Preliminary Report on Patentability and Written Opinion received for PCT Patent Application No. PCT/US2013/058938, mailed on Apr. 9, 2015, 6 pages.

* cited by examiner

VIDEO INDEXING WITH VIEWER REACTION ESTIMATION AND VISUAL CUE DETECTION

FIELD

The present disclosure relates to video indexing systems, and more particularly, to video indexing systems with viewer reaction estimation based on visual cue detection.

BACKGROUND

Existing systems for the management of video libraries, including categorization, search and retrieval, typically rely on video analysis algorithms that analyze the video stream to produce a single generalized result describing the content of the video. Different viewers, however, may have varying or personalized responses to a video that may not be captured by the single generalized result provided by an analysis algorithm.

Some systems may attempt to account for the viewers personalized experience by asking for user feedback. Such systems are often prone to error, however, due to user mistakes and/or misunderstanding of rating systems. The feedback is also typically limited to a single rating that encompasses the entire video due to the impracticality of requesting a continuous sampling of user responses throughout the video stream presentation. Additionally, these systems require that a special effort be made by the user which may detract from the quality of the user experience and is therefore generally undesirable.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides methods and systems for estimating viewer emotional reactions to videos based on detected visual cues and indexing the videos with metadata that includes information about the emotions and the timing of those emotions relative to frames of the video. The indexing system may be used for summarizing, partitioning and searching of the video based on these emotional events. In some embodiments, the indexing system may be used to identify a genre of the video and to search for other videos within a video library that are similar in genre or that may be expected to evoke similar emotional responses from the user. The system may also learn the preferences of a user based on the emotional reactions detected in response to viewing of other videos and make video recommendations based on these learned preferences. A database may store user profiles for multiple users that include the learned preferences for each user as well as links to a library of indexed videos, thus enabling the video recommendation and searching operations to be enhanced by the inclusion of emotional responses of other users, which may be referred to as crowd-sourcing.

Figure 1:
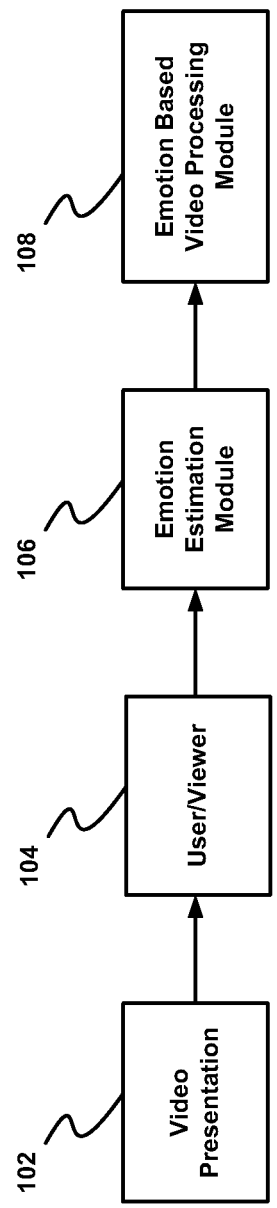
FIG. 1 illustrates a top level system diagram of one exemplary embodiment consistent with the present disclosure.

FIG. 1 illustrates a top level system diagram 100 of one exemplary embodiment consistent with the present disclosure. A video presentation 102 is viewed by a user 104. In some embodiments, the video presentation may be streaming video or any suitable type of media presentation. An emotion estimation module 106 may be configured to observe the user 104 as the video is being viewed and detect visual cues (e.g., facial features, head position/orientation, gaze point and eye movement patterns, etc.) from which the users emotional reactions may be estimated, as will be described in greater detail below. Emotion based video processing module 108 may be configured to index the video with metadata that includes the estimated user emotional responses and associated timing information relative to frames of the video. Emotion based video processing module 108 may further be configured to summarize, partition and/or search the video as well as perform additional operations, to be described in greater detail below, based on the indexing.

Figure 2:
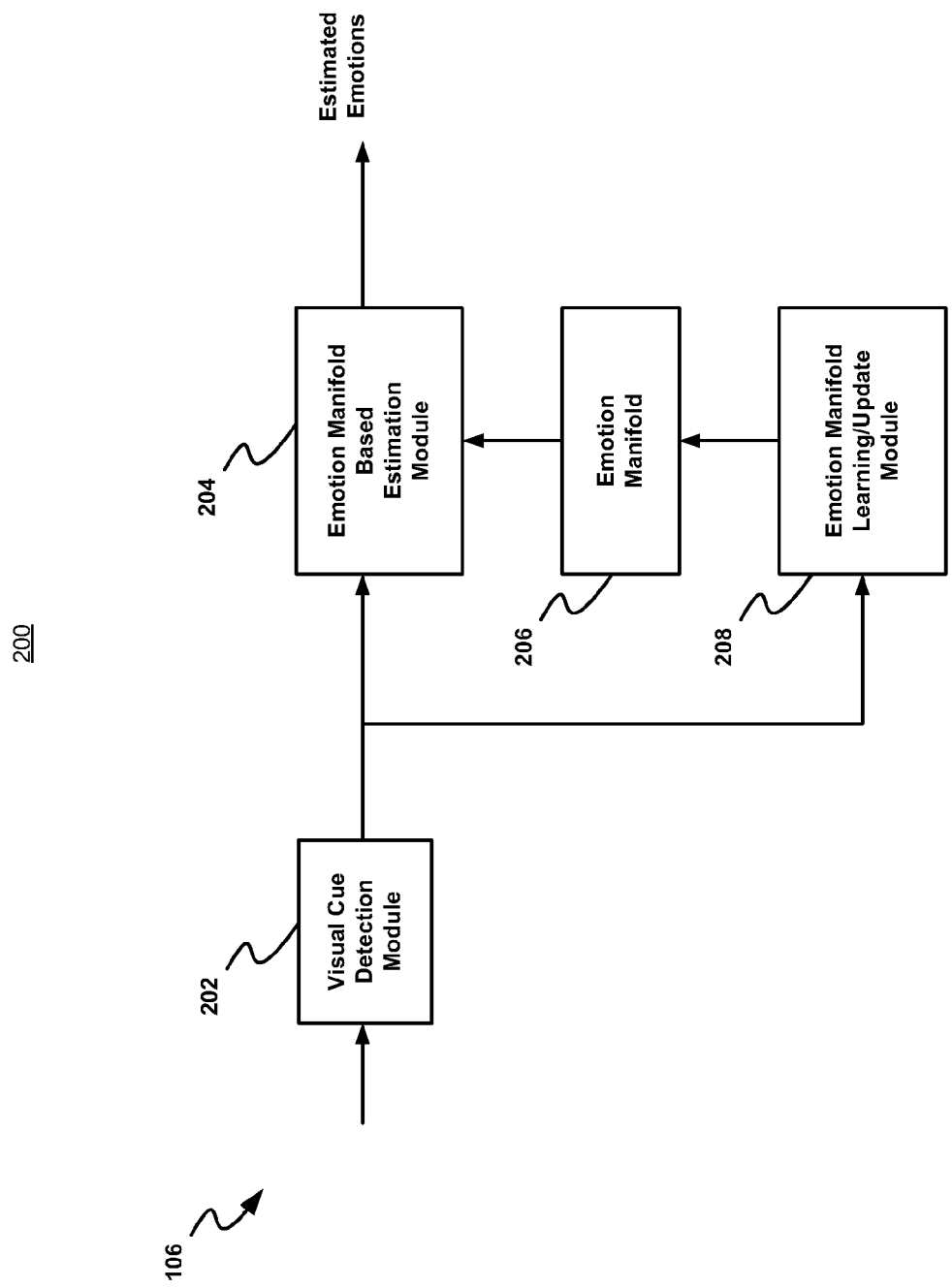
FIG. 2 illustrates a block diagram of one exemplary embodiment consistent with the present disclosure.

FIG. 2 illustrates a block diagram 200 of one exemplary embodiment consistent with the present disclosure. Emotion estimation module 106 is shown to comprise visual cue detection module 202, emotion manifold learning/update module 208, emotion manifold 206 and emotion manifold based estimation module 204.

As user 104 views video presentation 102, the user may experience a series of emotional states. Examples of emotional states may include happiness, sadness, anger, fear, disgust, surprise and contempt. In response to these emotional states, the user 104 may exhibit visual cues including facial features (e.g., location of facial landmarks, facial textures), head position and orientation, eye gaze and eye movement pattern, or any other detectable visual cue that may be correlated with an emotional state. Not all emotional states may be detected from visual cues and some distinct emotional states may share visual cues while some visual cues may not correspond to emotional states that have a common definition or name (e.g., a composition of multiple emotions or an emotional state that is between two or more emotions, such as a state between sadness and anger or a state that is composed of both happiness and surprise). The system may therefore be configured to estimate pseudo emotions which represent any subset of emotional states that can be uniquely identified from visual cues.

Figure 3:
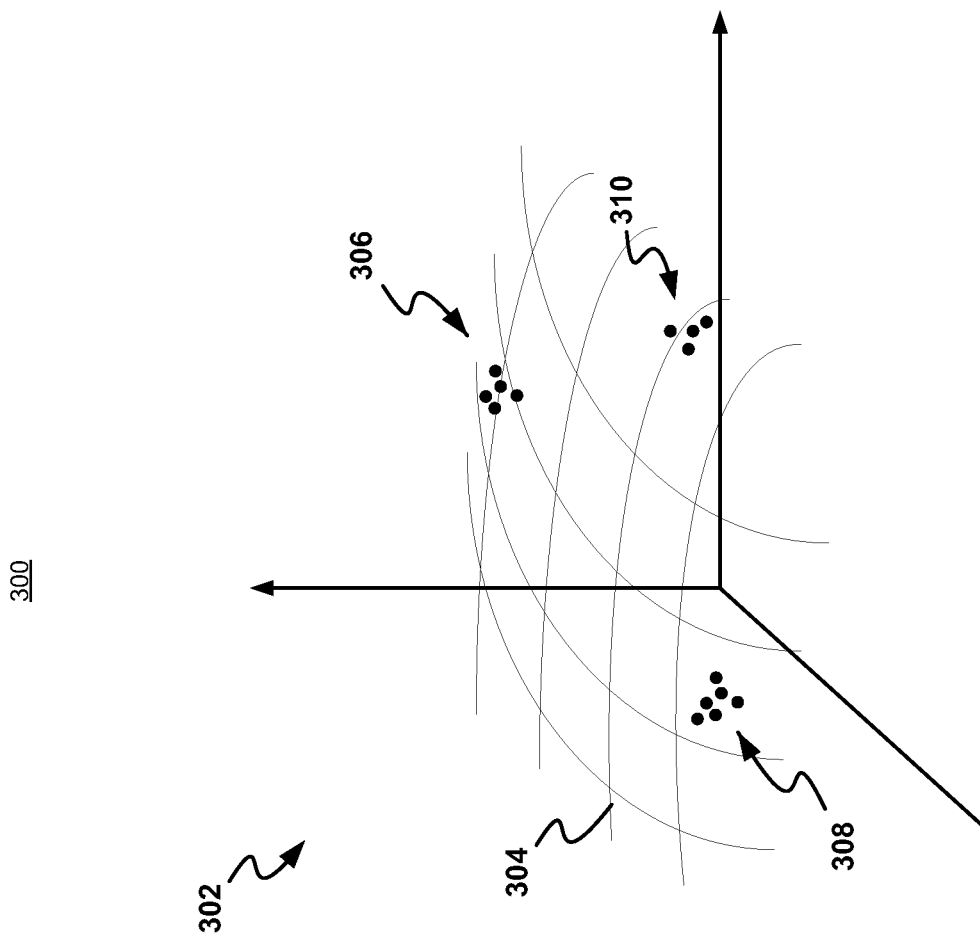
FIG. 3 illustrates a plot of an emotional manifold in a feature space consistent with an exemplary embodiment of the present disclosure.

As visual cues are detected by visual cue detection module 202 they are mapped to a feature space, an example of which is illustrated in FIG. 3 which shows a 3-dimensional feature space 302. The three axes of this feature space may represent, for example, the location of the corner of an eyebrow, the location of the corner of a lip and the tilt of the head. The detected features at any given time, corresponding to the appearance of the viewer at that time (or in a time interval), may then be represented by a coordinate in feature space; in this case a 3 dimensional coordinate. Clusters of coordinates 306, 308, 310 may be identified and found to lie on a manifold 206, 304 of pseudo emotions. The clusters may correspond to distinct emotional states of the viewing user 104 at a particular time during the video presentation 102. The manifold 206, 304 may be generated and/or updated through a learning process for which module 208 may be configured. In some embodiments, module 208 may be a support vector machine (SVM) classifier or any other suitable estimator or classifier.

Figure 4:
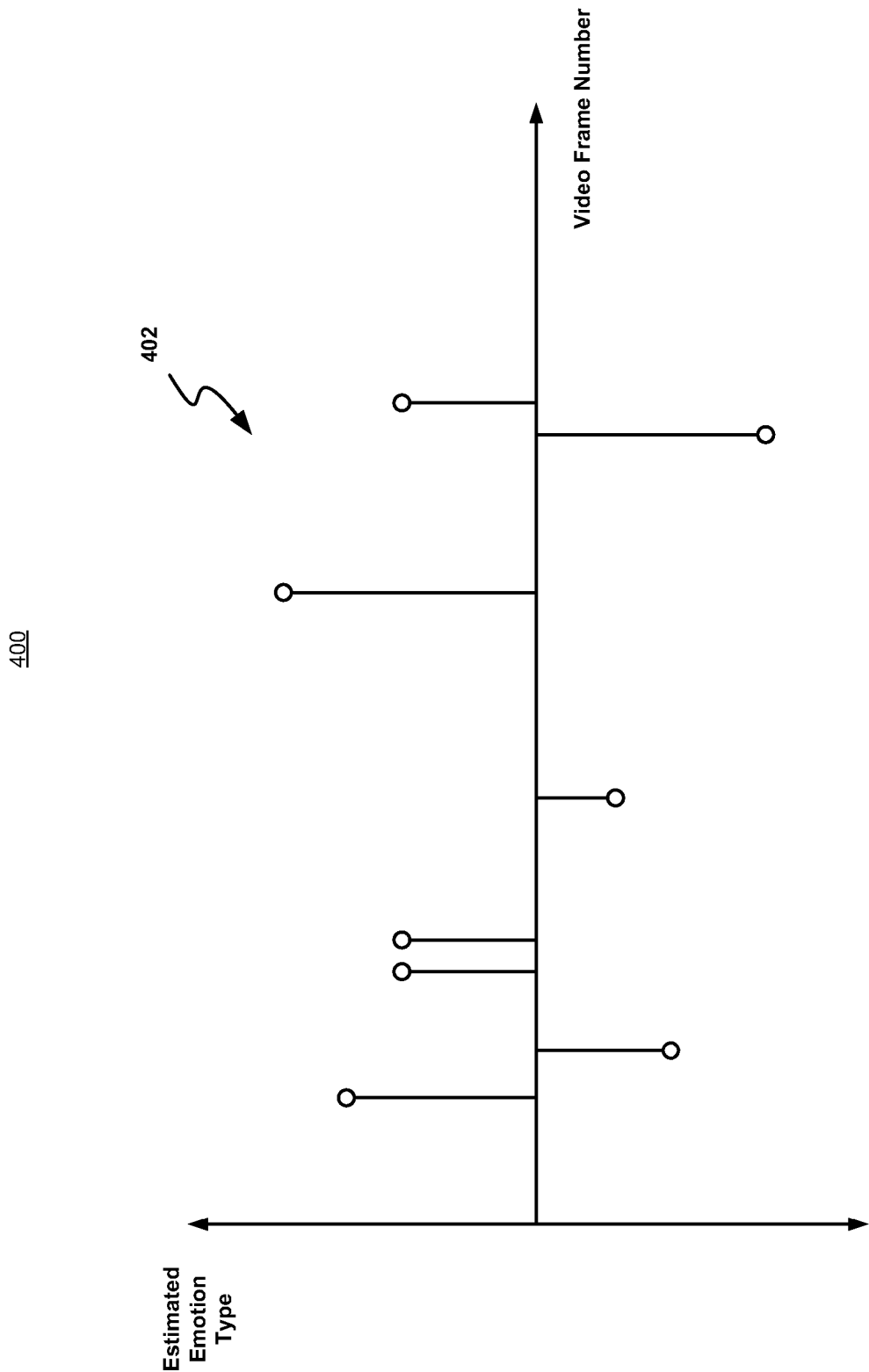
FIG. 4 illustrates a plot of estimated emotions consistent with an exemplary embodiment of the present disclosure.

The appearance of a viewer, as represented by a point in a feature space 302, represented in this example as a 3 dimensional space for simplicity, may be projected on to a lower dimensional space, e.g., a 2 dimensional emotion space or manifold 206, 304, representing properties of emotional states. In some embodiments, the appearance of the viewer may be projected onto a two dimensional emotional state property space where the two dimensions represent, for example, valence and arousal. Valence is a measure of the degree of positivity or negativity of an emotion (e.g., how pleasurable an emotion is), while arousal is a measure of the intensity of the emotion. Other properties may also be used including measures of dominant/submissive and strain/relaxation. Emotion manifold based estimation module 204 may be configured to estimate the emotional (or pseudo-emotional) state of the user 104 at a given time based on the mapping of the detected features from the feature space 302 to the property space (e.g., the lower dimension manifold 206, 304). This is illustrated in FIG. 4 which shows a plot of estimated emotions types 402 over time which may be associated with video frame numbers or frame time-stamps.

Figure 5:
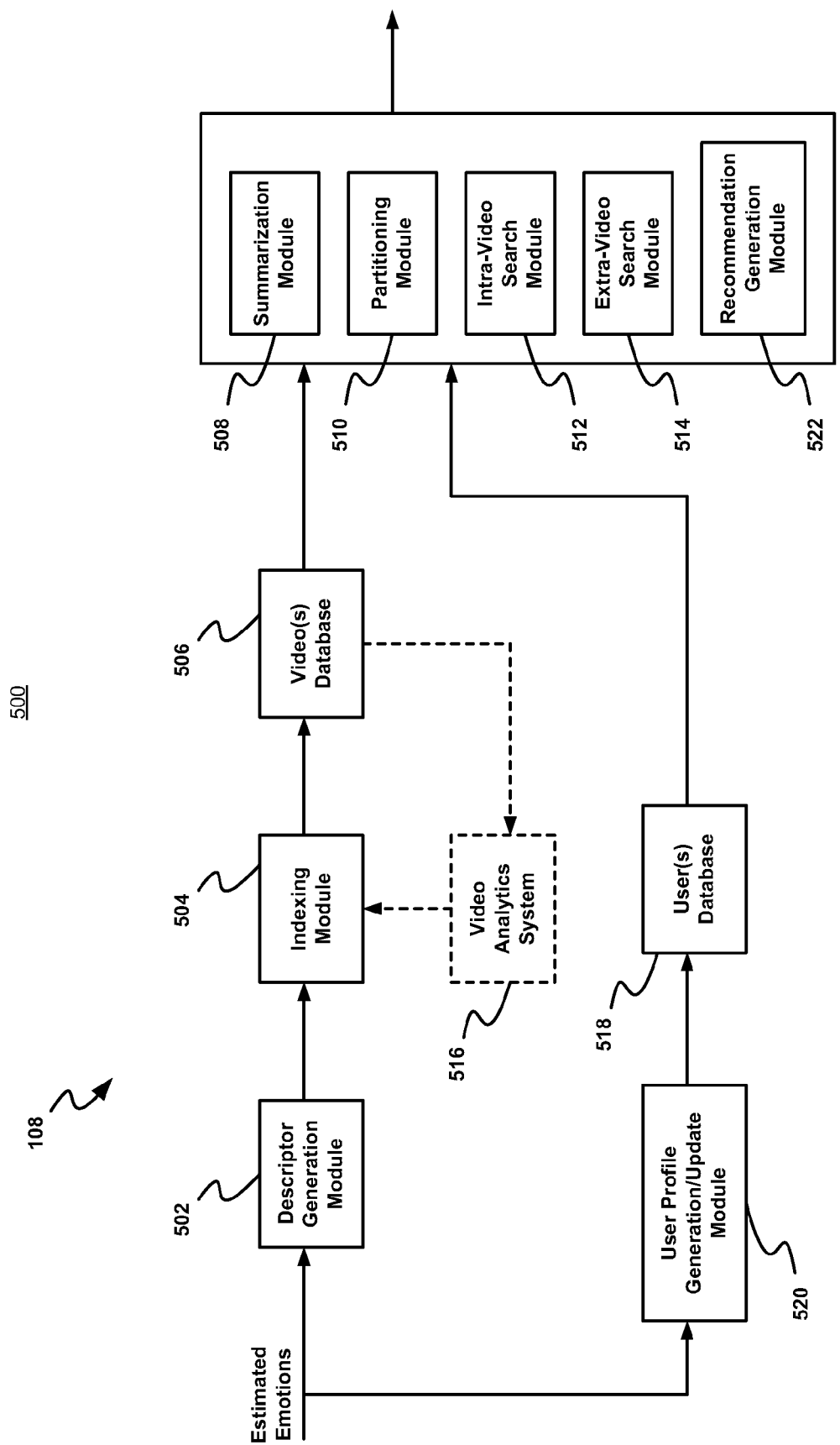
FIG. 5 illustrates a block diagram of another exemplary embodiment consistent with the present disclosure.

FIG. 5 illustrates a block diagram 500 of another exemplary embodiment consistent with the present disclosure. Emotion based video processing module 108 is shown to include descriptor generator module 502, indexing module 504, video and user databases 506, 518, user profile generation/update module 520, summarization module 508, partitioning module 510, intra-video search module 512, inter-video search module 514 and recommendation generation module 522.

Estimated emotions, generated by emotion estimation module 106, are received by descriptor generation module 502 which may be configured to convert the estimated emotions into a descriptor that may include, for example, genre classification, identification of dominant emotions, measurement of duration of climax and anti-climax of emotions and/or measurement of time intervals between emotional peaks. Indexing module 504 may be configured to index or tag the video by integrating the descriptor information, which may be in the form of metadata, into the video. The indexing may enable the efficient retrieval of information about the viewer's emotional states at various times during the video. A video database 506 may be created and maintained to comprise one or more of such indexed videos and may include indexing information that was generated from reactions of other users/viewers of such videos.

Summarization module 508 may be configured to extract segments of a video, for example a video from video database 506, that are associated with an increased density of emotional events that exceed an emotional intensity threshold. The density may be determined from the video indexing or metadata associated with the video. Such extracted segments may be combined to provide a summary of the video that may be tailored to the user. The length of the summary may be adjusted based on a setting of the intensity threshold.

Partitioning module 510 may be configured to partition the video into segments where the partitioning occurs at times associated with a relatively lower density of emotional events. The density may again be determined from the video indexing and the partitioning may thus be tailored to the user.

Intra-video search module 512 may be configured to search for segments, or short clips, within a video in response to a query from a user. For example, the user may request segments that are "funny" and the intra-video search module 512 may extract those segments based on the video index which identifies video frames that are associated with an emotional response related to humor. Inter-video search module 512 may operate in a similar manner, but may be configured to search for other videos, for example videos from video database 506, in response to the user query. For example, a request for "funny" may result in a search for videos that have a relatively larger number of emotional events associated with humor.

Recommendation generation module 522 may be configured to recommend videos, for example from video database 506, that are personalized to the user's taste. The recommendations may be based on the learned preferences of the user which in turn may be based on the emotional reactions detected in response to viewing of other videos as recorded in the video database 506 and user database 518. The user's emotional reactions may be compared to the emotional reaction of other users to enhance the recommendation process.

User profile generation/update module 520 may be configured to generate and maintain a user profile based on the estimated emotions generated by emotion estimation module 106. The user profile may comprise the learned manifold of emotional states 206 for that user. In some embodiments, the user profile may include any other information related to learned preferences for that user as well as links or references to indexed videos in the video database 506. In some embodiments, the user profile may additionally include information about the cultural background, gender and/or age of the user or any other information that may be used to group users into categories which may be useful for crowd-sourcing purposes as described below. The user profile may be updated as the manifold of emotional states 206 is updated, for example, as additional videos are viewed, and visual cues are detected and related to emotional states. The user profile may be stored in a user database 518 along with profiles of other users. The profiles of multiple users may be provided or otherwise made available to summarization module 508, partitioning module 510, searching modules 512, 514 and recommendation generation module 522 along with the indexed videos from video database 506 comprising index information generated from multiple users. By providing such information obtained from multiple users or groups of users, the operations of summarizing, partitioning, searching and recommending may be enhanced by the inclusion of emotional responses of other users (e.g., crowd-sourcing). For example, a video search, performed in response to a user request, may be based on that user's previously recorded emotional reaction to other videos or it may be based on the emotional reaction of other users, having a similar profile. In some embodiments, the availability of data from multiple users may be used to average or filter out errors that may occur.

In some embodiments, a video analytics system 516 may be configured to provide an additional generalized analysis of the video stream, for example an analysis that does not account for a user's emotional reactions. These automated analysis results may be incorporated into the indexing operations performed by module 504 and may be integrated into the metadata for that video which may in turn be used to advantage by any of the processing modules 508, 510, 512, 514 and 522.

Figure 6:
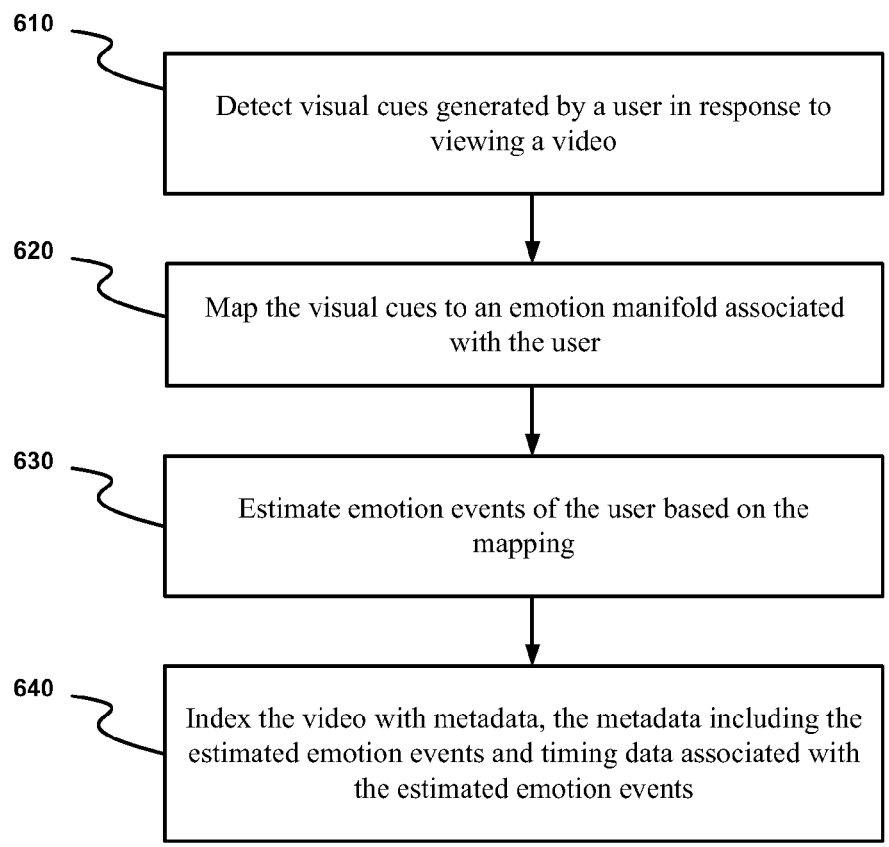
FIG. 6 illustrates a flowchart of operations of an exemplary embodiment consistent with the present disclosure.

FIG. 6 illustrates a flowchart of operations 600 of an exemplary embodiment consistent with the present disclosure. At operation 610, visual cues generated by a user in response to viewing of a video are detected. The video may be a video stream. At operation 620, the visual cues are mapped to an emotion manifold (or some feature/property space) associated with the user (or a general space accounting for all humans or a sub-group of humans). At operation 630, emotion events of the user are estimated based on the mapping. At operation 640, the video is indexed with metadata, the metadata including the estimated emotion events and timing data associated with the estimated emotion events. The timing data may be related to frame numbers associated with the video stream or the elapsed time relative to the beginning of the video or relative to any other suitable reference time. The timing data may therefore be a time-stamp. The indexed video may then be used to facilitate summarization, partitioning, searching and recommendation operations.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides a system, method and computer readable storage media for estimating viewer emotional reactions to videos based on detected visual cues and indexing the videos with metadata that includes information about the emotions and the timing of those emotions relative to frames of the video.

The system may include a visual cue detection module configured to detect visual cues generated by a user, the visual cues generated in response to the user viewing the video. The system of this example may also include an emotion estimation module configured to map the visual cues to an emotion space associated with the user and estimate emotion events of the user based on the mapping. The system of this example may further include a video indexing module configured to index the video with metadata, the metadata including the estimated emotion events and timing data associated with the estimated emotion events.

Another example system includes the forgoing components and the video indexing module is further configured to identify video frame time-stamps associated with the emotion events, the identifying based on the timing data.

Another example system includes the forgoing components and further includes a video summarization module configured to extract frames of the video based on a density of emotion events in the extracted frames exceeding a threshold, and the density is determined from the indexing.

Another example system includes the forgoing components and further includes a video partitioning module configured to segment the video at frame locations based on a density of emotion events in the frames falling below a threshold, and the density is determined from the indexing.

Another example system includes the forgoing components and further includes an intra-video search module configured to search for frames in the video associated with requested emotion events, the searching based on the indexing.

Another example system includes the forgoing components and further includes a user profile generation module configured to create and maintain a database of user profiles, the user profiles including the emotion spaces associated with the user and one or more other users.

Another example system includes the forgoing components and further includes an indexed video database configured to store the indexed videos including metadata associated with the user and the one or more other users.

Another example system includes the forgoing components and further includes an inter-video search module configured to search for videos associated with requested emotion events from the user, the searching based on the indexed video database.

According to another aspect there is provided a method. The method may include detecting visual cues generated by a user, the visual cues generated in response to the user viewing the video. The method of this example may also include mapping the visual cues to an emotion space associated with the user. The method of this example may further include estimating emotion events of the user based on the mapping. The method of this example may further include indexing the video with metadata, the metadata including the estimated emotion events and timing data associated with the estimated emotion events.

Another example method includes the forgoing operations and further includes identifying video frame time-stamps associated with the emotion events, the identifying based on the timing data.

Another example method includes the forgoing operations and further includes extracting frames of the video to generate a summary of the video, the extracting based on a density of emotion events in the frames exceeding a threshold, and the density is determined from the indexing.

Another example method includes the forgoing operations and further includes partitioning the video at frame locations based on a density of emotion events in the frames falling below a threshold, and the density is determined from the indexing.

Another example method includes the forgoing operations and further includes searching for frames in the video associated with requested emotion events, the searching based on the indexing.

Another example method includes the forgoing operations and further includes estimating a genre of the video based on frequency, duration and types of the emotion events.

Another example method includes the forgoing operations and further includes maintaining a database of user profiles, the user profiles including the emotion spaces associated with the user and one or more other users; and maintaining a database of the indexed videos including metadata associated with the user and the one or more other users.

Another example method includes the forgoing operations and further includes searching for videos associated with requested emotion events from the user, the searching based on the database of indexed videos.

Another example method includes the forgoing operations and further includes recommending videos for the user based on comparisons between: the emotion space associated with the user; the emotion space associated with the other users in the user profile database; and the metadata in the indexed video database.

According to another aspect there is provided at least one computer-readable storage medium having instructions stored thereon which when executed by a processor, cause the processor to perform the operations of the method as described in the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for video indexing, said system comprising:
   a visual cue detection module configured to detect visual cues generated by a user, said visual cues generated in response to said user viewing said video;
   an emotion estimation module configured to map said visual cues to an emotion space having at least two dimensions, each of said at least two dimensions representing a different emotional state property, wherein said emotion space is associated with said user and said emotion estimation module estimates emotion events of said user based on an existence of at least one grouping of said visual cues on said mapping, wherein each distinct grouping of said visual cues represents a distinct estimated emotional event; and
   a video indexing module configured to index said video with metadata, said metadata comprising said estimated emotion events and timing data associated with said estimated emotion events.

2. The system of claim 1, wherein said video indexing module is further configured to identify video frame time-stamps associated with said emotion events, said identifying based on said timing data.

3. The system of claim 1, further comprising a video summarization module configured to extract frames of said video based on a density of emotion events in said extracted frames exceeding a threshold, wherein said density is determined from said indexing.

4. The system of claim 1, further comprising a video partitioning module configured to segment said video at frame locations based on a density of emotion events in said frames falling below a threshold, wherein said density is determined from said indexing.

5. The system of claim 1, further comprising an intra-video search module configured to search for frames in said video associated with requested emotion events, said searching based on said indexing.

6. The system of claim 1, further comprising a user profile generation module configured to create and maintain a database of user profiles, said user profiles comprising said emotion spaces associated with said user and one or more other users.

7. The system of claim 1, further comprising an indexed video database configured to store said indexed videos comprising metadata associated with said user and said one or more other users.

8. The system of claim 7, further comprising an inter-video search module configured to search for videos associated with requested emotion events from said user, said searching based on said indexed video database.

9. A method for video indexing, said method comprising:
   detecting visual cues generated by a user, said visual cues generated in response to said user viewing said video;
   mapping said visual cues to an emotion space having at least two dimensions, each of said at least two dimensions representing a different emotional state property, wherein said emotion space is associated with said user;
   estimating emotion events of said user based on an existence of at least one grouping of said visual cues on said mapping, wherein each distinct grouping of said visual cues represents a distinct estimated emotional event; and
   indexing said video with metadata, said metadata comprising said estimated emotion events and timing data associated with said estimated emotion events.

10. The method of claim 9, further comprising identifying video frame time-stamps associated with said emotion events, said identifying based on said timing data.

11. The method of claim 9, further comprising extracting frames of said video to generate a summary of said video, said extracting based on a density of emotion events in said frames exceeding a threshold, wherein said density is determined from said indexing.

12. The method of claim 9, further comprising partitioning said video at frame locations based on a density of emotion events in said frames falling below a threshold, wherein said density is determined from said indexing.

13. The method of claim 9, further comprising searching for frames in said video associated with requested emotion events, said searching based on said indexing.

14. The method of claim 9, further comprising estimating a genre of said video based on frequency, duration and types of said emotion events.

15. The method of claim 9, further comprising:
    maintaining a database of user profiles, said user profiles comprising said emotion spaces associated with said user and one or more other users; and
    maintaining a database of said indexed videos comprising metadata associated with said user and said one or more other users.

16. The method of claim 15, further comprising searching for videos associated with requested emotion events from said user, said searching based on said database of indexed videos.

17. The method of claim 15, further comprising recommending videos for said user based on comparisons between:

said emotion space associated with said user;
said emotion space associated with said other users in said user profile database; and
said metadata in said indexed video database.

18. One or more non-transitory computer-readable storage memories having instructions stored thereon which when executed by a processor result in the following operations for video indexing, said operations comprising:
  detecting visual cues generated by a user, said visual cues generated in response to said user viewing said video;
  mapping said visual cues to an emotion space having at least two dimensions, each of said at least two dimensions representing a different emotional state property, wherein said emotion space is associated with said user;
  estimating emotion events of said user based on an existence of at least one grouping of said visual cues on said mapping, wherein each distinct grouping of said visual represents a distinct estimated emotional event; and
  indexing said video with metadata, said metadata comprising said estimated emotion events and timing data associated with said estimated emotion events.

19. The one or more computer-readable storage memories of claim 18, further comprising the operation of identifying video frame time-stamps associated with said emotion events, said identifying based on said timing data.

20. The one or more computer-readable storage memories of claim 18, further comprising the operation of extracting frames of said video to generate a summary of said video, said extracting based on a density of emotion events in said frames exceeding a threshold, wherein said density is determined from said indexing.

21. The one or more computer-readable storage memories of claim 18, further comprising the operation of partitioning said video at frame locations based on a density of emotion events in said frames falling below a threshold, wherein said density is determined from said indexing.

22. The one or more computer-readable storage memories of claim 18, further comprising the operation of searching for frames in said video associated with requested emotion events, said searching based on said indexing.

23. The one or more computer-readable storage memories of claim 18, further comprising the operation of estimating a genre of said video based on frequency, duration and types of said emotion events.

24. The one or more computer-readable storage memories of claim 18, further comprising the operations of:
  maintaining a database of user profiles, said user profiles comprising said emotion spaces associated with said user and one or more other users; and
  maintaining a database of said indexed videos comprising metadata associated with said user and said one or more other users.

25. The one or more computer-readable storage memories of claim 24, further comprising the operation of searching for videos associated with requested emotion events from said user, said searching based on said database of indexed videos.

26. The one or more computer-readable storage memories of claim 24, further comprising the operation of recommending videos for said user based on comparisons between:
  said emotion space associated with said user;
  said emotion space associated with said other users in said user profile database; and
  said metadata in said indexed video database.

* * * * *